Patented Jan. 12, 1932

1,840,576

UNITED STATES PATENT OFFICE

JOHN FREI, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS FOR THE MANUFACTURE OF DIPHENYLAMINE

No Drawing. Application filed December 22, 1926, Serial No. 156,522. Renewed April 6, 1929.

My invention relates to a process for the production of diarylamines, and in particular to a process for producing diphenylamine by treating aniline at an elevated temperature in the presence of a catalyst.

The object of my invention is to provide a process for the manufacture of diarylamines, and in particular for diphenylamine which provides a means of more safely maintaining proper reaction conditions than has heretofore been considered possible, and at the same time making use of less expensive types of equipment than has been possible in the past.

The most generally known processes heretofore used in the manufacture of diarylamines have comprised heating a primary aromatic amine with equal molecular proportions of the hydrochloride of a primary aromatic amine, the resulting products being ammonium chloride and the desired secondary diarylamine. This type of process has had a number of disadvantages, for example, expensive acid-proof equipment has been required, which has necessitated excessive upkeep costs. Also, it has been found troublesome to properly handle the finished charge containing large quantities of ammonium chloride.

The process described by Lachman, U. S. Patent 1,549,136, for manufacture of diphenylamine uses benzene sulphonic acid as a catalyst, and operates without pressure. It has the defect, however of, using an almost prohibitive amount of catalytic material, and gives low conversion of aniline to diphenylamine per unit of time consumed in the operation, so that the process is unduly costly.

A very successful previously used process for the manufacture of diphenylamine has involved heating aniline together with small amounts of a hydrogen halide in an autoclave under pressure at a temperature of about 300° C. and at a pressure of about 300 lbs. per sq. in. During the course of the reaction, ammonia is given off, which is released from time to time in order to maintain the desired pressure.

I have discovered that in the manufacture of diarylamines in the presence of a catalytic material maintenance of temperature of reaction is highly important in order to produce the maximum yields and conversions, and that in addition, in order to obtain the most desirable results in this direction, it is essential that the charge undergoing treatment be maintained at all times in an actively boiling condition. I have found that the most satisfactory method of accomplishing these conditions is by refluxing the charge under treatment at the temperature desired for reaction while constantly regulating the pressure at a point which will give active boiling of the charge. This regulation of pressure can best be accomplished by controlling the rate of outflow of the ammonia from the reaction vessel. In such a process I may use as catalyst an acid or acid forming material which does not decompose at the temperature of the reaction and which does not enter into side reactions with the other materials involved.

For example, in the manufacture of diphenylamine, I may place in an autoclave aniline and an acid material or an acid forming material which does not decompose at the temperature of reaction, for instance, ten parts aniline and one part aniline hydrochloride. The autoclave is then heated to a temperature of approximately 300° C., and a pressure of approximately 300 lbs. per sq. inch, after which the gases produced by the reaction are permitted to pass from the autoclave through a reflux condenser which serves to return to the autoclave all aniline and diphenylamine which may be vaporized. The cold vapors of ammonia are drawn off as fast as formed by means of a valve located on the cold side of the reflux condenser. If this valve is opened too far, sufficient ammonia will pass through the autoclave to materially lower the pressure and thereby the temperature of the autoclave charge. On the other hand, if this valve is not opened sufficiently, the pressure in the autoclave will build up to such a point that the charge will not boil actively at a temperature of 300° C., in which case the reaction will slow down. In carrying out my invention I find it satisfactory to maintain a constant temperature in the autoclave, so regulating the valve as to keep a constant reflux returning to the autoclave. As the reaction proceeds with formation of diphenylamine the vapor pressure of the charge decreases, due to replacement of aniline by the high boiling diphenylamine. When operating in this fashion, therefore, the pressure in the autoclave will gradually fall off so that when the concentration of diphenylamine in the charge has approached 75% the pressure will have dropped to approximately 70 pounds per square inch. I may carry the reaction still further by the same method, but I have found it most satisfactory to interrupt the reaction at this point, the autoclave being discharged and the diphenylamine separated from the residual aniline by means of fractional distillation in accordance with previously known methods.

Similarly, in the manufacture of para-ethoxy-phenyl-alpha-naphthylamine, I may heat 1 part alpha-naphthylamine and 1.2 parts para-phenetidine with .02 part sulphanilic acid as a catalyst to a temperature of about 220° C. in a vessel provided with a reflux condenser. Reaction does not start to an appreciable extent until active boiling of the charge starts, which must be brought about by application of a vacuum to the vessel. As the reaction proceeds with evolution of ammonia, active boiling is maintained by gradually reducing the pressure. Very excellent conversions and yields of product result in a very short time.

While I have stated particular conditions of reaction and agents which I prefer, I may make many variations in this process and method without departing from my invention. For example, my process is applicable to the manufacture of diarylamines from various primary aromatic amines, such as aniline, toluidines, xylidines, naphthylamines and phenetidine; I may use as catalyst any acid or acid forming material not decomposed at the temperature of reaction, and not entering into side reactions with the other materials in the autoclave. For diphenylamine, I have found hydrogen chloride a very satisfactory catalyst, but I may use instead other halogens or hydrogen halides. I may vary the temperature at which reaction is carried out over a wide range, thus controlling the speed of reaction. In any event, however, control of pressure is so maintained as to give an actively boiling condition in the autoclave charge.

Similarly, I may vary the quantity of catalyst over a wide range. For example, reaction will be produced by as little as a few tenths of 1% of catalyst, or by amounts approaching that necessary for converting half the aniline charge to aniline hydrochloride. However, if too little catalyst is used the reaction becomes undesirably slow, and if too much is used tar formation becomes objectionable. I find that the best results are obtained with quantities of hydrogen chloride between 1½% and 5% of the total charge.

As many apparently widely different embodiments of this invention may be made without departing from the spirit thereof, it is to be understood that I do not limit myself to the foregoing examples or descriptions except as indicated in the following patent claims.

I claim:

1. The process of producing diarylamines, which comprises refluxing under pressure, in an actively boiling condition, at least one arylamine in the presence of a catalyst, and gradually reducing the pressure as the boiling point of the mass rises, at such a rate as to keep the charge actively boiling, and at the same time maintaining a temperature sufficiently low to substantially avoid decomposition.

2. The process of producing diarylamines, which comprises refluxing under pressure, in an actively boiling condition, at least one arylamine in the presence of a catalyst, and releasing the ammonia formed at such a rate as to gradually reduce the pressure as the boiling point of the mass rises, in order to keep the charge actively boiling, and at the same time maintaining a temperature sufficiently low to substantially avoid decomposition.

3. The process set forth in claim 1, in which the catalyst is an acid material that does not decompose at the temperature of the reaction.

4. The process set forth in claim 1, in which the catalyst is a hydrogen halide.

5. The process set forth in claim 2, in which the catalyst is an acid material that does not decompose at the temperature of the reaction.

6. The process set forth in claim 2, in which the catalyst is a hydrogen halide.

7. The process of condensing aniline to diphenylamine, which comprises refluxing aniline under pressure, in an actively boiling condition, in the presence of a catalyst, and gradually reducing the pressure as the boiling point of the mass rises, at such a rate as to keep the charge actively boiling, and at the same time maintaining a temperature sufficiently low to substantially avoid decomposition.

8. The process of condensing aniline to diphenylamine, which comprises refluxing aniline under pressure, in an actively boiling condition, in the presence of a catalyst, and releasing the ammonia formed at such a rate as to gradually reduce the pressure as the boiling point of the mass rises, in order to keep the charge actively boiling, and at the same time maintaining a temperature sufficiently low to substantially avoid decomposition.

9. The process set forth in claim 7, in which the catalyst is a hydrohalide.

10. The process set forth in claim 8, in which the catalyst is a hydrohalide.

11. The process of condensing aniline to diphenylamine, which comprises refluxing aniline, in an actively boiling condition under pressure, in the presence of a hydrogen halide, releasing the ammonia formed at such a rate as to gradually reduce the pressure to 50 to 100 pounds per square inch, as the boiling point of the mass rises, in order to keep the charge actively boiling, and at the same time maintaining a temperature sufficiently low to substantially avoid decomposition.

12. The process set forth in claim 11 in which the hydrohalide is hydrogen chloride.

13. The process of condensing aniline to diphenylamine, which comprises refluxing aniline under pressure in an actively boiling condition, in the presence of a catalyst, releasing the ammonia formed at such a rate as to gradually reduce the pressure as the boiling point of the mass rises, in order to keep the charge actively boiling, and continuing the heating under such reduced pressure at a boiling point of approximately 300° C. until completion of the reaction.

14. The process of condensing aniline to diphenylamine, which comprises refluxing aniline under pressure, in an actively boiling condition, in the presence of aniline hydrohalide, and gradually reducing the pressure as the boiling point of the mass rises, at such a rate as to keep the charge actively boiling, and at the same time maintaining a temperature sufficiently low to avoid decomposition.

15. The process of condensing aniline to diphenylamine, which comprises refluxing aniline under pressure, in an actively boiling condition, in the presence of 1% to 5% of aniline hydrochloride, and releasing the ammonia formed at such a rate as to gradually reduce the pressure as the boiling point of the mass rises, in order to keep the charge actively boiling, and at the same time maintaining a temperature of approximately 300° C. to substantially avoid decomposition.

16. The process of condensing aniline to diphenylamine which comprises refluxing aniline under pressure in the presence of a catalyst which does not decompose at the temperature of the reaction and which does not enter into side reactions with other materials, gradually reducing the pressure as the boiling point of the mass rises, at such a rate as to keep the charge actively boiling, and at the same time maintaining a temperature sufficiently low to substantially avoid decomposition.

17. The process of producing diarylamines which comprises refluxing a primary aromatic amine in the presence of a catalyst which does not decompose at the temperature of the reaction and which does not enter into side reactions with other materials, gradually reducing the pressure as the boiling point of the mass rises, at such a rate as to keep the charge actively boiling, and at the same time maintaining a temperature sufficiently low to substantially avoid decomposition.

18. The process of claim 17 in which the primary aromatic amine contains a nuclear substituted alkyl group.

19. The process of claim 17 in which the primary aromatic amine contains a nuclear substituted alkoxy group.

20. The process of producing diarylamines which comprises refluxing an alkyl ether of a primary aromatic amine under pressure in the presence of a catalyst which does not decompose at the temperature of the reaction and which does not enter into side reactions with other materials, gradually reducing the pressure as the boiling point of the mass rises, at such a rate as to keep the charge actively boiling, and at the same time maintaining a temperature sufficiently low to substantially avoid decomposition.

21. The process of producing diarylamines which comprises refluxing a primary aromatic amine in the presence of a catalyst which does not decompose at the temperature of the reaction and which does not enter into side reactions with other materials, and operating the process at a pressure sufficiently high to give a reasonably good speed of the reaction, but at a pressure that is insufficiently high to prevent boiling.

In testimony whereof I affix my signature.

JOHN FREI.